(12) United States Patent
Schloss

(10) Patent No.: US 6,406,661 B1
(45) Date of Patent: Jun. 18, 2002

(54) HEAT SET BLOW MOLDING PROCESS

(75) Inventor: Francis M. Schloss, Perrysburg, OH (US)

(73) Assignee: Plastic Technologies, Inc., Holland, OH (US)

( * ) Notice: Subject to any disclaimer, the term of this patent is extended or adjusted under 35 U.S.C. 154(b) by 0 days.

(21) Appl. No.: 09/900,421

(22) Filed: Jul. 6, 2001

(51) Int. Cl.⁷ .............................. B29C 49/64
(52) U.S. Cl. ...................... 264/521; 264/904
(58) Field of Search ................ 264/521, 904

(56) References Cited

U.S. PATENT DOCUMENTS

| | | | |
|---|---|---|---|
| 4,151,249 A | * 4/1979 | Lee | 264/520 |
| 4,339,409 A | * 7/1982 | Curto | 264/509 |
| 4,385,089 A | 5/1983 | Bonnebat et al. | |
| 4,701,121 A | * 10/1987 | Jakobsen et al. | 425/526 |
| 4,839,127 A | 6/1989 | Ajmera et al. | |
| 4,883,631 A | 11/1989 | Ajmera | |
| 5,419,866 A | 5/1995 | Valyi | |
| 5,618,489 A | 4/1997 | Weissmann | |

* cited by examiner

*Primary Examiner*—Suzanne E. McDowell
(74) *Attorney, Agent, or Firm*—Donald R. Fraser

(57) ABSTRACT

A heat set blow molding process comprises providing a plastic preform, thermally conditioning the preform to achieve a temperature profile across the wall of the preform wherein the inner surface of the preform is at a higher temperature than the outer surface of the preform, said temperature profile being within the molecular orientation temperature range of the plastic, heating the outer surface of the preform to increase the temperature of the outer surface of the preform by at least about 10° C., enclosing the preform in a hot mold, expanding the preform to form a container within the hot mold by introducing a blowing gas into the preform to induce biaxial orientation in the preform and force the preform into conforming contact with the hot mold, and maintaining the expanded preform in conforming contact with the hot mold for a time sufficient to induce crystallization of the plastic material and to allow for stress relaxation.

15 Claims, No Drawings

HEAT SET BLOW MOLDING PROCESS

FIELD OF THE INVENTION

The present invention relates to a heat set blow molding process. More particularly, the invention is directed to pretreatment of a preform just prior to heat set blow molding same, including increasing the temperature of the exterior surface layer of the preform before it is placed within a blow mold.

BACKGROUND OF THE INVENTION

Biaxially oriented bottles may be manufactured from plastic materials such as polyethylene terephthalate (PET) using both single stage and two-stage machinery. For example, when using the two-stage process, bottles can be manufactured using either of two distinctly different blowing methods. One method of blowing bottles is accomplished by heating preforms from ambient conditions to the lowest possible temperature (but above the glass transition temperature) which will allow for the proper stretching of the material followed by blowing the heated preform into a cold blow mold as rapidly as possible. This process can produce a bottle that has excellent properties for use in many packaging applications, especially for use as a carbonated soft drink bottle. An additional step of conditioning the preform to provide a homogeneous temperature or a temperature distribution across the wall of the preform may be combined with the basic process. The molecular orientation of the material improves the mechanical and optical properties of the ultimately produced container.

This biaxial orientation, however, also increases internal stresses within the container, thereby resulting in dimensional instability under hot conditions. The oriented material has a tendency to shrink, for example during hot filling of a so-produced biaxially oriented container, which relieves the internal stresses but which causes distortion and deformation of the container. This phenomenon is particularly evident when using amorphous polymer preforms which undergo strain induced crystallization during the drawing process, such as for example those made from polyesters, particularly PET.

Biaxially oriented containers which are manufactured for use as bottles for pressurized liquid are conventionally made using a process wherein the preform is blown into conformance with a chilled mold. But in order to increase the dimensional stability of biaxially oriented containers to make them useful for "hot fill" operations, it is necessary to thermo-fix or "heat set" the biaxially oriented container in such a way that substantially relieves the remaining internal stresses.

Heat set blow molding also enhances the crystallinity of the structure of a biaxially oriented container, as well as relieves some of the internal residual stresses so that the container will retain its shape when exposed to hot fill temperatures. Generally, the blowing process is modified to heat the preform to a temperature higher than that normally required to stretch the preform. This hotter preform is then blown into as hot a blow mold as possible. Typically during such a heat set blow molding process, great quantities of air or another gas are blown across the inner surface of the container being formed. The gas acts to cool and to set the inner surface of the container to produce a rigid structure. The introduction of the gas is necessary to prevent the container from shrinking since the outer surface of the container is still hot (above Tg) at the time the blowing gas pressure is relieved and the mold is opened. Moreover, the blowing speed is frequently reduced in a heat set blow molding process, to allow the blown container to maintain contact with the hot blow mold for a long period of time.

However, even utilizing the heat set blow molding process, there are limits to how hot the so-produced containers may be filled. Even heat set blow molded containers will exhibit some amount of shrinkage during the hot filling process, and the containers must, therefore, be designed to account for such shrinkage.

The overall blow mold quality of a well-designed heat set blow molded container may be determined by a combination of factors direct to the economics of the process (impacted by the speed of blowing) and the surface temperature of the hot blow mold (limited by the amount of cooling gas which can be blown through the container). For example, it is known that it is possible to manufacture superior heat set blow molded containers by utilizing hot blow molds at higher than normal temperatures, but this requires the use of great quantities of super-cold blowing gasses. These processes are more complicated and may not be cost effective.

U.S. Pat. No. 4,385,089 to Bonnebat et al. discloses a heat set blow molding process wherein the temperature of the hot blow mold is maintained at a level that is lower than that desirable for manufacturing high quality blow molded containers.

U.S. Pat. No. 4,883,631 to Ajmera discloses a heat set blow molding process wherein severe cooling fluids, such as for example liquid carbon dioxide, are utilized to off-set the tendency for shrinkage of the container in contact with the hot blow mold.

It must be noted that the prior art referred to hereinabove has been collected and examined only in light of the present invention as a guide. It is not to be inferred that such diverse art would otherwise be assembled absent the motivation provided by the present invention, nor that the cited prior art when considered in combination suggests the present invention absent the teachings herein.

It would be desirable to develop a heat set blow molding process for making high quality containers suitable for hot fill operations, which process employs high heat set temperatures without excessive use of cold blowing gasses.

SUMMARY OF THE INVENTION

Accordant with the present invention, an improved process for heat set blow molding a plastic container has surprisingly been discovered. The process comprises the following steps:

providing a plastic preform;

thermally conditioning the preform, to achieve a temperature profile across the wall of the preform wherein the inner surface of the preform is at a higher temperature than the outer surface of the preform, the temperature profile being within the molecular orientation temperature range of the plastic;

heating the outer surface of the preform, to increase the temperature of the outer surface of the preform by a minimum of about 10° C.; higher than the temperature that would normally result from a heat-set preform temperature profile;

enclosing the preform in a hot mold;

expanding the preform to form a container within the hot mold, by introducing a blowing gas into the preform to induce biaxial orientation in the preform and force the preform into conforming contact with the hot mold; and maintaining the expanded preform in conforming contact with the hot mold for a time sufficient to induce at least partial crystallization of the plastic material.

The present invention is particularly well-suited for preparing plastic containers for hot fill applications, such as for example for filling with hot juices or sauces.

DETAILED DESCRIPTION OF THE PREFERRED EMBODIMENT

The present invention is directed to an improved heat set blow molding process, comprising providing a plastic preform, thermally conditioning the preform to achieve a temperature profile across the wall of the preform wherein the inner surface of the preform is at a higher temperature than the outer surface of the perform, said temperature profile being within the molecular orientation temperature range of the plastic, then heating the outer surface of the preform to increase the temperature of the outer surface of the preform by a minimum of about 10° C., enclosing the preform in a hot mold, expanding the preform to form a container within the hot mold by introducing a blowing gas into the preform to induce biaxial orientation in the preform and forcing the preform into conforming contact with the hot mold, and maintaining the expanded preform in conforming contact with the hot mold for a time sufficient to induce at least partial crystallization of the plastic material.

Conventional methods for preparing plastic preforms are well known in the art. The preforms are generally produced by injection molding or by extrusion molding processes. Examples of well-known amorphous and semicrystalline plastics from which preforms may be made according to the present invention comprise, but are not necessarily limited to, acrylonitrile acid esters, vinyl chloride, polyolefins, polyamides, and polyesters, as well as derivatives, blends, and copolymers thereof. A preferred plastic comprises a polyester or a derivative, blend, or copolymer thereof. A particularly preferred plastic comprises polyethylene terephthalate (PET).

The term "preform" as it is used herein also includes hollow, shaped parisons comprising multiple layers which may be made by conventional forming techniques. For example, a preform according to the present invention may comprise an exterior layer of PET and an interior barrier layer of ethylene vinyl alcohol.

The plastic preform is thermally conditioned to achieve a temperature profile across the wall of the preform, wherein the inner surface of the preform is preferably at a higher temperature than the outer surface of the preform. Additionally, the target temperature profile is within the molecular orientation temperature range of the selected plastic material. It is important to elevate the inner surface of the preform to a temperature higher than the outer surface of the preform, to achieve uniform strain hardening of the plastic across the container wall thickness upon expansion of the preform during the blowing process. The inner surface of the preform needs to be at a higher temperature than the outer surface of the preform, because the inner surface of the preform must stretch further than the outer surface during the blowing process.

Methods for thermally conditioning the preform to achieve the temperature profile necessary according to the present invention are well known. A conventional method includes the use of infrared radiation directed toward the preform. Because such energy is absorbed to a higher extent on the outer surface of the preform, and less on the inner surface, conventional blow molding equipment is designed to blow air across the outer surface of the preform being heated by the infrared radiation, to keep the outer surface of the preform cooler while allowing the heat energy to absorb into and soak through the preform wall to the inner surface. Thus, the preform is thermally conditioned to have a temperature profile across its wall thickness wherein the inner surface temperature is greater than the outer surface temperature.

Alternatively, the temperature profile according to the present invention may be established by successively heating the outer surface of the preform by conventional means, allowing the applied heat to soak through the wall to the inner surface of the preform, and passing a cooling gas over the outer surface of the preform. This process will eventually raise the inner surface temperature to a level whereat the temperature profile will be appropriate for conducting the biaxial orientation blow molding process. This method for establishing the temperature profile according to the present invention is more fully set forth in U.S. Pat. No. 4,571,173 which is hereby incorporated herein in its entirety by reference thereto.

Conveniently, the temperature profile according to the present invention is within the molecular orientation temperature range of the plastic, which is additionally above its glass transition temperature and below its crystalline melting point. This is the temperature range wherein a high degree of orientation may be achieved with good uniformity of wall thickness distribution and without risk of breaking under stretching conditions. Thus, for a conventional PET material for example, the molecular orientation temperature may range from about 90° C. to about 140° C.

After the desired temperature profile has been established for the preform, the outer surface of the preform is thereafter quickly heated, to increase the temperature a minimum of about an additional 10° C. Only the very outer surface layer region of the preform is heated thus. In this step of the process, the previously established temperature profile across the thickness of the preform is not greatly altered; except that the temperature of the extreme outer surface region of the preform is heated to a temperature at least a minimum of about 10° C. higher than that originally established for the temperature profile.

It has been determined that heating the outer surface of the preform at this point in the heat set blow molding process according to the present invention greatly enhances the hot fill performance of the container produced thereby. Since conventional heat set blow molding processes are limited by the inability to elevate the temperature of the surface of the hot mold to a very high level (because of cooling limitations at the inner surface of the resulting blown bottle), the present invention employs an alternative preform heating method by elevating the outer surface of the preform; viz., the outer surface or skin is rapidly heated immediately after achieving the desired heat profile in the preform wall and then quickly blown into a container. The intent is to heat the outer surface of the preform to effect an improvement in the container heat set quality without negatively affecting the stretch characteristics throughout the majority of the preform wall. The much higher outer surface temperature of the preform will translate into a higher outer surface temperature on the container immediately after stretching, just as if the hot mold were at a higher temperature; but without the need for increasing the blowing gas flow rate into the preform against the inner surface of the preform, and without the need to cool the blowing gas to an extremely low temperature. Since the temperature of the outer surface of the preform may be even greater than the temperature of the surface of the hot mold as a result of this heating step, it is possible that the outer surface of the expanded preform within the hot mold may become even more strain relaxed and crystallized to a greater extent compared to heat set blow molded containers prepared without this heating step.

Crystallizable plastic materials are known to undergo rapid thermal crystallization at elevated temperatures. For PET, for example, rapid crystallization may occur at temperatures from about 150° C. to about 225° C. If the preform were to be maintained at these elevated temperatures for more than a very short period of time (in the range of seconds), the plastic material would begin to thermally crystallize and become hazy. Thereafter, depending upon the degree of thermally induced crystallinity, the blow molding process may become more difficult. Accordingly, it is an important aspect of the present invention that the time required for heating the outer surface of the preform and the elevated temperature ultimately attained be balanced against and complementary with the time necessary to heat the outer surface of the preform, enclose it in the hot mold, and expand the preform therein, in such a manner to minimize the preform and ultimately produced container haze, thereby producing the clearest containers possible.

A slight amount of haze in the ultimately produced container may be tolerated in order to achieve higher crystallinity. Thus, this step of heating the outer surface of the preform is to be carried out in a manner so as to greatly increase the outer surface temperature of the preform, while at the same time minimizing the haze and maximizing the beneficial effects of crystallinity near the outer surface of the container produced according to the present invention. In all cases, the temperature of the outer surface of the preform will be greater than the outer surface temperature of a preform prepared by a conventional heat set blow molding process, thereby resulting in enhanced crystallinity and reduced stresses at the outer surface of a container produced according to the present invention.

The outer surface of the preform may be heated by any conventional method. For example, it may be heated by passing a hot gas stream over the outer surface of the preform, or by use of an impinging flame, or by use of quartz or cal-rod heaters. The outer surface of the preform is to be heated at least about an additional 10 degrees C. above the temperature of the outer surface of the preform established for the temperature profile. The highest temperature to which the preform surface can be heated is limited by the temperature at which the particular plastic used begins to soften and melt. For PET, this temperature is about 225° C.

After the outer surface of the preform has been heated, the preform is enclosed in a hot mold, as is conventionally known for the heat set blow molding process. The surface of the closed hot mold cavity defines the desired shape of the blown container. The temperature of the cavity surface of the hot mold at the time the preform is enclosed therein may vary over wide limits from about 32° C. to about 260° C. Preferably, the hot mold temperature ranges from about 110° C. to about 160° C.

The preform is expanded within the hot mold to form the desired container by the introduction of a blowing gas into the preform through its open end. Thus, the preform is stretched in a manner that induces biaxial orientation of the molecules in the walls of the container. The preform continues to expand within the hot mold until the walls of the container conform to the shape of the hot mold cavity. When the blown container achieves contact with the surface of the cavity within the hot mold, the container is maintained in contact with the hot mold cavity surface by continued application of the blowing gas pressure for a time sufficient to cool the inner surface of the container sufficiently to maintain the shape of the container when the blowing pressure is stopped and the blow mold opens. The time period for maintained contact depends upon the plastic material used, the hot mold temperature, the temperature of the blowing gas, as well as other factors, and may vary from about 1 second to about 30 seconds. For most commercial processes, the time period for contact between the blown container and the hot mold cavity surface should be as long as possible and usually ranges from about 2 seconds to about 5 seconds. Methods for heat set blow molding containers are more fully set forth in U.S. Pat. No. 4,883,631 which is hereby incorporated herein in its entirety by reference thereto.

EXAMPLES

A number of PET preforms are prepared and thermally conditioned to achieve a temperature profile within the molecular orientation range. The outer surfaces of the preforms are thereafter heated by various means, thereby attaining the temperature increases indicated. After heat set blow molding the preforms to form containers, the overall container shrinkage for each example is then measured upon filling with hot water at about 90–91° C.

TABLE I

|  | Heating Method | Preform Surface Temp. Increase | % Volume Shrinkage % |
|---|---|---|---|
| Example 1 | Hot Air | 11° C. | 1.8% |
| Example 2 | Flame | 24° C. | 1.7% |
| Comparison | None | 0° C. | 2.4% |

It is observed that containers prepared according to the present invention experience diminished shrinkage upon hot filling.

These Examples may be repeated with similar success by substituting the generically or specifically described materials and/or conditions recited herein for those set forth in the preceding Examples.

While it is preferred to utilize a gas such as air in the blowing process, it will be understood that other fluids could be utilized.

From the foregoing description, one ordinarily skilled in the art can easily ascertain the essential characteristics of this invention and, without departing from its spirit or scope, can make various changes and modifications to adapt the invention to various uses and conditions.

What is claimed is:

1. A heat set blow molding process, comprising:
   providing a plastic preform;
   thermally conditioning the preform, to achieve a temperature profile across the wall of the preform wherein the inner surface of the preform is at a higher temperature than the outer surface of the preform, said temperature profile being within the molecular orientation temperature range of the plastic;
   heating the outer surface of the preform, to increase the temperature of the outer surface of the preform by at least about 10° C.;
   enclosing the preform in a hot mold;
   expanding the preform to form a container within the hot mold, by introducing a blowing fluid into the preform to induce biaxial orientation in the expanded preform upon stretching and force the expanded preform into conforming contact with the hot mold; and
   maintaining the expanded preform in conforming contact with the hot mold for a time sufficient to induce at least partial crystallization of the plastic material and to cool and to make rigid the inner surface of the expanded preform.

2. The heat set blow molding process according to claim 1, wherein the plastic preform comprises a strain-hardenable crystallizable material, such as polyethylene terephthalate.

3. The heat set blow molding process according to claim 1, wherein the plastic preform comprises multiple layers.

4. The heat set blow molding process according to claim 1, wherein the molecular orientation temperature ranges from about 90° C. to about 140° C.

5. The heat set blow molding process according to claim 1, wherein the temperature of the hot mold ranges from about 32° C. to about 260° C.

6. The heat set blow molding process according to claim 5, wherein the temperature of the hot mold ranges from about 110° C. to about 160° C.

7. The heat set blow molding process according to claim 1, wherein the expanded preform is maintained in conforming contact with the hot mold for a period of time from about 1 second to about 30 seconds.

8. The heat set blow molding process according to claim 7, wherein the expanded preform is maintained in conforming contact with the hot mold for a period of time from about 2 seconds to about 5 seconds.

9. A heat set blow molding process, comprising:

providing a plastic preform, said plastic preform comprising strain-hardenable crystallizable materials, including polyethylene terephthalate;

thermally conditioning the preform to achieve a temperature profile across the wall of the preform wherein the inner surface of the perform is at a higher temperature than the outer surface of the preform, the temperature profile being within the molecular orientation temperature range for polyethylene terephthalate, the molecular orientation temperature ranging from about 90 degrees C to about 140 degrees C;

rapidly heating the outer surface of the preform, to increase the temperature of the outer surface of the preform by at least about 10 degrees C;

enclosing the preform in a hot mold, the hot mold being at a temperature ranging from about 110 degrees C to about 160 degrees C;

expanding the perform to form a container within the hot mold, by introducing a blowing gas into the preform to induce biaxial orientation in the blown container and force the preform into conforming contact with the hot mold; and maintaining the expanded preform in conforming contact with the hot mold for a period of time from about 1 second to about 30 seconds to induce crystallization of the plastic material and to allow for stress relaxation.

10. The heat set blow molding process according to claim 9, wherein the plastic preform comprises polyethylene terephthalate.

11. The heat set blow molding process according to claim 9, wherein the plastic preform comprises multiple layers.

12. The heat set blow molding process according to claim 9, wherein the temperature of the hot mold ranges from about 110° C. to about 160° C.

13. The heat set blow molding process according to claim 9, wherein the expanded preform is maintained in conforming contact with the hot mold for a period of time from about 2 seconds to about 5 seconds.

14. A heat set blow molding process, comprising:

providing a plastic preform, said plastic preform comprising polyethylene terephthalate;

thermally conditioning the preform to achieve a temperature profile across the wall of the preform wherein the inner surface of the preform is at a higher temperature than the outer surface of the preform, the temperature profile being within the molecular orientation temperature range for polyethylene terephthalate, the molecular orientation temperature ranging from about 90° C. to about 140° C.;

heating the outer surface of the preform to increase the outer surface of the preform by at least about 10° C.;

enclosing the preform in a hot mold, the hot mold being at a temperature ranging from about 110° C. to about 160° C.;

expanding the preform to form a container within the hot mold, introducing a blowing gas into the preform to expand the preform to form a container and to induce biaxial orientation in the expanded preform and to force the preform into conforming contact with the hot mold; and maintaining the expanded preform in conforming contact with the hot mold for a period of time from about 2 seconds to about 5 seconds to induce crystallization of the polyethylene terephthalate and to allow for stress relaxation.

15. The heat set blow molding process according to claim 14, wherein the plastic preform comprises multiple layers.

* * * * *